United States Patent
Burcham

(10) Patent No.: US 6,615,469 B1
(45) Date of Patent: Sep. 9, 2003

(54) METHOD FOR RETROFITTING AN UNDERDRAIN

(75) Inventor: Brian K. Burcham, Decatur, IL (US)

(73) Assignee: All Service Contracting Corporation, Decatur, IL (US)

(*) Notice: Subject to any disclaimer, the term of this patent is extended or adjusted under 35 U.S.C. 154(b) by 0 days.

(21) Appl. No.: 09/710,744

(22) Filed: Nov. 9, 2000

Related U.S. Application Data

(60) Provisional application No. 60/164,419, filed on Nov. 9, 1999.

(51) Int. Cl.[7] .................. B23K 17/04; B23K 23/00; B23P 17/00; B23P 19/04; B01D 24/12
(52) U.S. Cl. .................. 29/401.1; 29/402.01; 29/423; 29/237; 210/292; 210/293
(58) Field of Search .................. 29/401.1, 402.01, 29/402.18, 423, 424, 237, 282; 210/291, 292, 289, 293

(56) References Cited

U.S. PATENT DOCUMENTS

| | | | |
|---|---|---|---|
| 1,151,313 A | | 8/1915 | Wheeler |
| 1,871,122 A | | 8/1932 | Kretzschmar |
| 2,401,121 A | | 5/1946 | Thoresen et al. |
| 2,622,739 A | | 12/1952 | Nilsson et al. |
| 2,648,439 A | | 8/1953 | Miller |
| 2,767,852 A | | 10/1956 | Ellila |
| 3,081,877 A | * | 3/1963 | Jacobs et al. |
| 3,456,804 A | | 7/1969 | McGivern |
| 3,468,422 A | * | 9/1969 | Camp |
| 4,604,197 A | | 8/1986 | Louboutin et al. |
| 4,624,783 A | | 11/1986 | Black et al. |
| 4,707,257 A | | 11/1987 | Davis et al. |
| 4,925,556 A | | 5/1990 | Gaudin et al. |
| 5,087,361 A | * | 2/1992 | Gaudin et al. .............. 210/293 |
| 5,176,827 A | | 1/1993 | Walter |
| 6,190,568 B1 | * | 2/2001 | Hunkele ..................... 210/767 |

OTHER PUBLICATIONS

MonoFlor® Underdrain: Product Information Sheet, pp. 1–4, 1990.
New Underdrain Plate for Portable Water Filtering Provides for Retention of Finer Media; Improves Filtration Performance & Efficiency, *Tetra Filtration News*, vol. 1(1), pp.1–2 (1998).
Ublock® Underdrain: Product Information Sheet, pp. 1–4.
Anthratech Flexscour® Underdrain: Product Information Sheet, pp. 1–4.
Lo–Profile® Continuous Lateral Underdrain: Product Information Sheet, pp. 1–4.
Brackett Bosker® Underdrain Plate: Product Information Sheet, p. 1.

* cited by examiner

*Primary Examiner*—John C. Hong
(74) *Attorney, Agent, or Firm*—Barnes & Thornburg

(57) ABSTRACT

An apparatus for retrofitting a water filtration underdrain and a method therefor are provided. The apparatus comprises a nozzle for uniform water distribution through the filtration media, a conduit to provide fluid flow communication between the nozzle and an opening in the underdrain, and a filler substance configured to fill depressions of the type generally found in Bell bottom and Wheeler underdrain systems. Alternatively, the apparatus may comprise a nozzle and a pre-molded insert formed to mate with the depression including a channel to provide fluid flow communication between the nozzle and an opening in the underdrain. Methods for retrofitting a water filtration underdrain system using such devices are also provided.

12 Claims, 13 Drawing Sheets

METHOD FOR RETROFITTING AN UNDERDRAIN

CROSS REFERENCE TO RELATED APPLICATIONS

This application claims priority under 35 U.S.C. §119(e) to U.S. Provisional Application Ser. No. 60/164,419, filed Nov. 9, 1999, which is expressly incorporated herein by reference.

FIELD OF THE INVENTION

The present invention relates to a method and apparatus for retrofitting a filtration system underdrain.

BACKGROUND OF THE INVENTION

The present invention is primarily useful for retrofitting a Bell bottom underdrain, Wheeler underdrain, or any other depression-type underdrain. These types of underdrains are used in water filtration systems. In general, underdrains are used to support filtration media including such media as layers of sand, gravel, and anthracite. Water flowing through the filtration medium is purified and collected by the underdrain. The underdrains are also designed to allow water to be reverse injected (i.e, upwardly through the filtration medium) for periodic cleansing of the filtration medium as discussed below.

The present invention provides a cost-effective method/apparatus for retrofitting an underdrain such as a Bell bottom or Wheeler underdrain. In the past, when glass caps in the Bell bottom underdrain broke or became inoperable, the underdrain had to be torn out and replaced with a different type of underdrain. Replacement of the Bell bottom underdrain was required because the glass caps used in the Bell bottom underdrain are no longer commercially available. Similarly, when ceramic balls in the Wheeler underdrain were damaged, the balls had to be replaced at great cost or the underdrain had to be torn out and replaced. These replacement procedures are obviously expensive and time-consuming. The present invention provides a method and apparatus for retrofitting a filtration system underdrain, such as a Bell bottom or a Wheeler underdrain, obviating the need for replacement of the underdrains.

Additional features and advantages of the invention will become apparent to those skilled in the art upon consideration of the detailed description below and of illustrated embodiments exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE INVENTION

Figure 1:
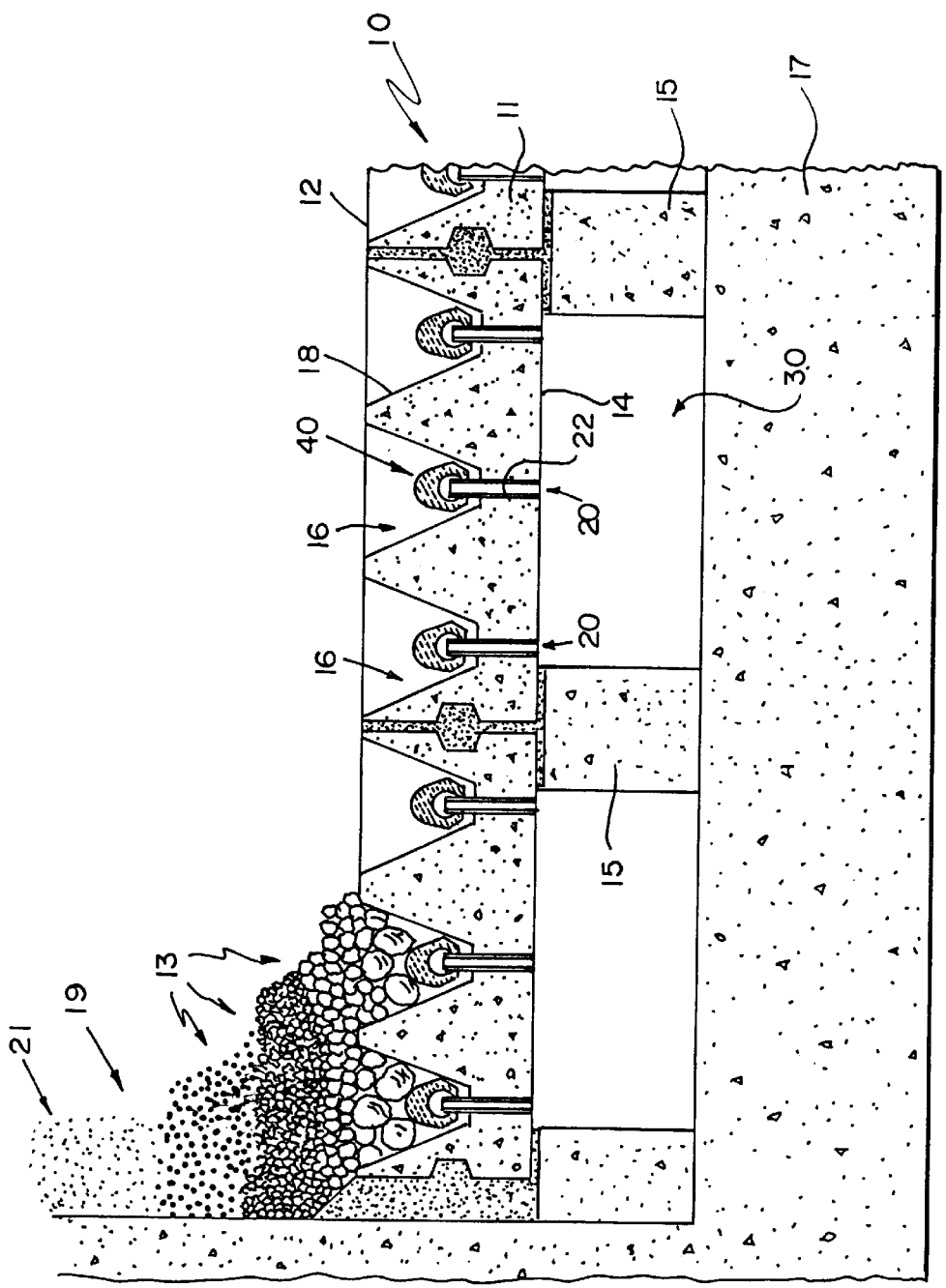
FIG. 1 is a cross-sectional view of a Bell bottom underdrain.
Figure 2:
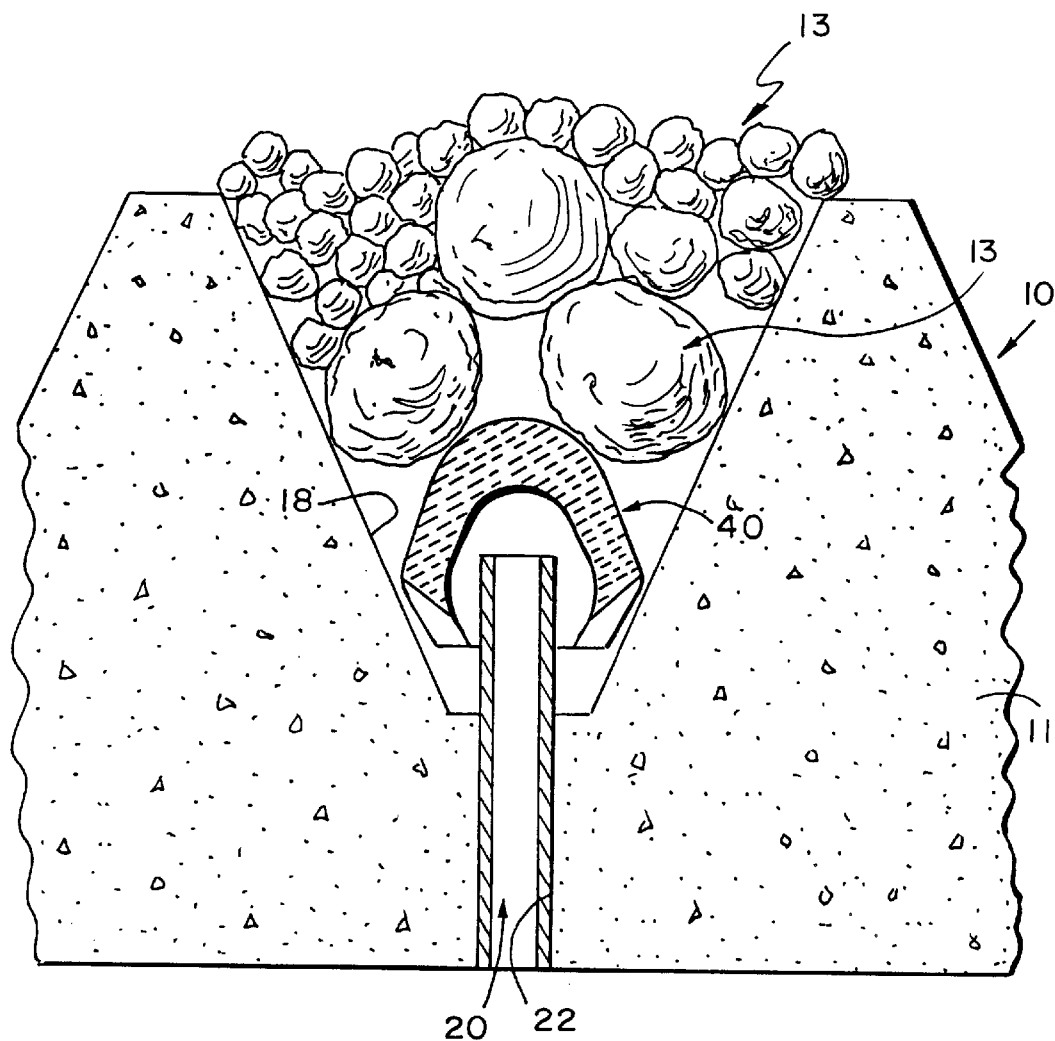
FIG. 2 is a cross-sectional view of a Bell bottom underdrain showing detail of a single depression including a glass cap.

The Bell bottom underdrain system 10 is shown in FIGS. 1 and 2 as it appears before undergoing the retrofitting process of the present invention. As shown in FIG. 1, Bell bottom underdrain system 10 has an underdrain 11 that is a concrete structure at the bottom of a water filtration tank. Underdrain 11 has a top surface 12, a bottom surface 14, and a plurality of depressions 16 formed by depression surfaces 18. Underdrain 11 is supported above a floor slab 17 by blocks 15 so that a plenum 30 extends longitudinally between the bottom surface 14 of underdrain 11 and the top surface of floor slab 17.

A plurality of ports 20 are formed in underdrain 11. Each port 20 extends from the base of each depression 16 into plenum 30. Ports 20 allow water to flow downwardly or upwardly through underdrain 11.

Bell bottom underdrain system 10 also includes a pipe 22 that extends through port 20 and a glass cap 40 resting on the top of pipe 22, as shown in FIGS. 1 and 2. The purpose of glass cap 40 is to distribute cleansing water in a uniform fashion when the water is reverse-fed upwardly through the underdrain and filtration system, and to prevent the filtration media from passing through pipe 22.

Several layers of gravel 13 are placed on top of underdrain 11 as shown in FIG. 1. The bottom layer of large sized gravel 13 fills depression 16 around glass cap 40 and supports the relatively finer layers of gravel 13, torpedo sand 19, and anthracite coal 21.

In operation, water containing suspended solids is delivered on top of the filtration media (i.e., anthracite coal 21, sand 19, and gravel 13), and it flows under gravity through the media into depressions 16 of underdrain 11. The water travels around glass cap 40, into pipe 22, and through port 20 to enter plenum 30. The filtered water is then collected and distributed to residential homes and other filtered water users.

After prolonged filtering of impure water, the filtration media must be cleaned. For cleaning, water is reverse-fed through plenum 30 so that the water travels upwardly through ports 20 into depressions 16. Glass cap 40 mounted to pipe 22 distributes the water and prevents the bottom injected water from "channeling" through the filtration media. Glass cap 40 deflects the upwardly flowing water so that the injected water is more uniformly distributed as it moves through the filtration media.

Figure 3:
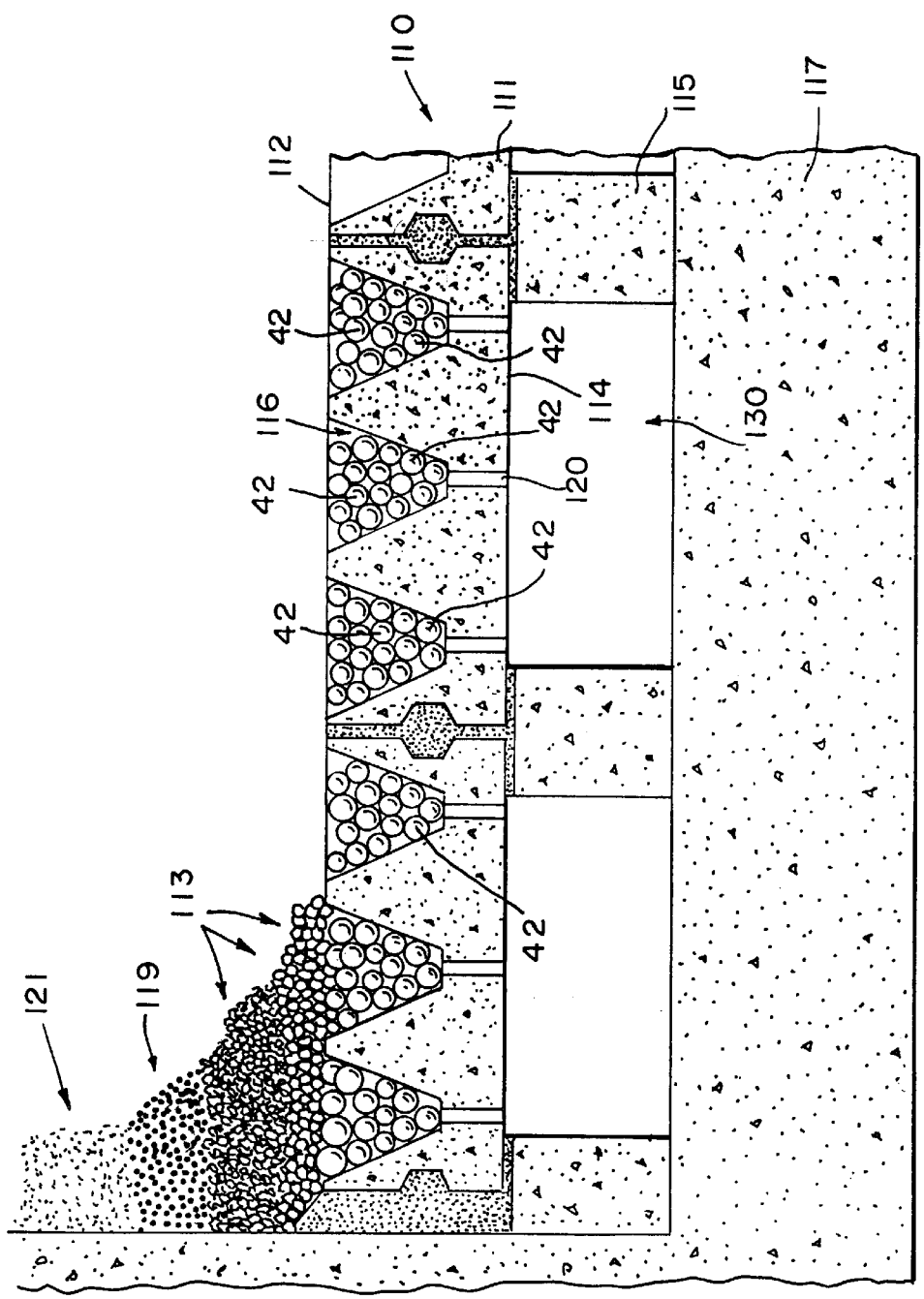
FIG. 3 is a cross-sectional view of a Wheeler underdrain.

Wheeler underdrain system 110 is shown in FIG. 3. Wheeler underdrain system 110 is similar to Bell bottom underdrain system 10 in that it also contains an underdrain 111 having a top surface 112, a bottom surface 114, and a plurality of depressions 116. Underdrain 111 is supported above a floor slab 117 by blocks 115 so that a plenum 130 extends longitudinally between the bottom surface 114 of underdrain 111 and the top surface of floor slab 117. A plurality of ports 120 are formed in underdrain 11. Each port extends from the base of each depression 116 into plenum 130. Ports 120 allow water to flow downwardly or upwardly through underdrain 111.

Wheeler underdrain system 110, however, does not include pipe 22 nor glass cap 40. Instead, Wheeler underdrain system 110 includes ceramic balls 42 of varying sizes which are placed into depressions 116 to provide the same function as glass cap 40. In other words, ceramic balls 42 deflect the upwardly flowing cleansing water to more uniformly distribute the injected backwash water throughout the layers of gravel 113, sand 119, and anthracite coal 121.

The present invention provides a cost effective method/apparatus for retrofitting any depression-type underdrain, such as, for example, a Bell bottom underdrain system 10 or Wheeler underdrain system 110. In the past, when glass caps 40 in Bell bottom underdrain system 10 broke or became inoperable, underdrain 11 had to be torn out and replaced with a different type of underdrain. Replacement of the underdrains was required because glass caps 40 are no longer commercially available. Similarly, when ceramic balls 42 in the Wheeler underdrain system 110 were damaged, either the ceramic balls 42 had to be replaced at great cost, or underdrain 11 had to be torn out and replaced. These replacement procedures are obviously expensive and time consuming.

Figure 4:
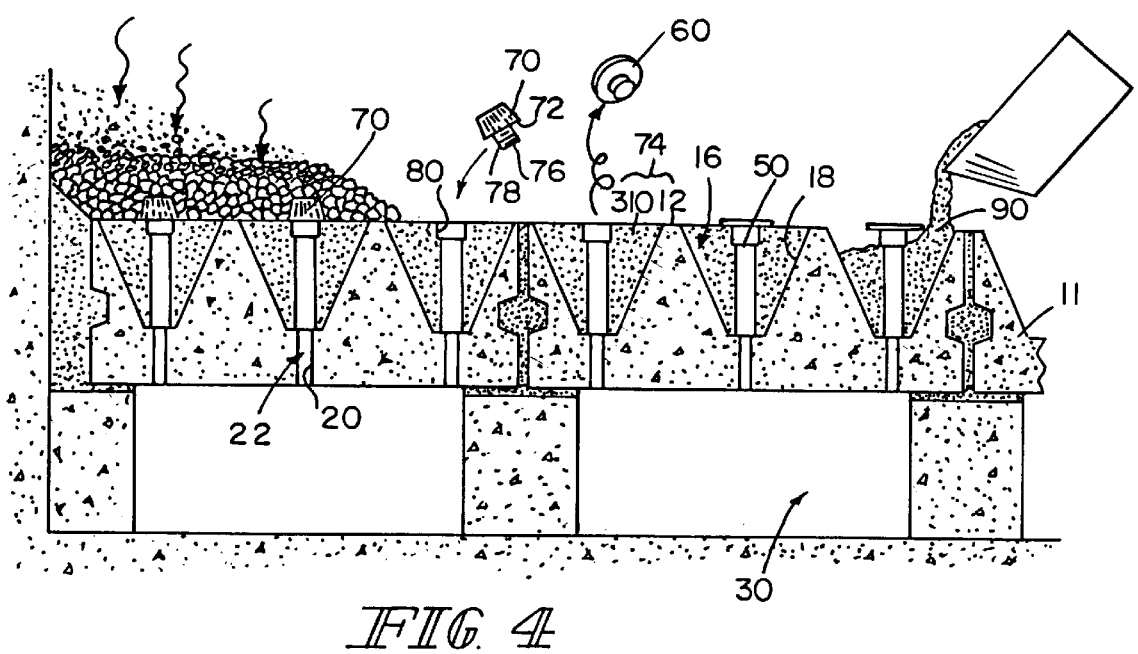
FIG. 4 is a cross-sectional view of an underdrain during various stages of the retrofit method of the present invention.

The current invention provides a way to duplicate the function of glass caps 40 and/or ceramic balls 42 using existing underdrain 11, 111. The process involves: (1) removing all filter media and the glass caps 40 or ceramic balls 42, (2) inserting (as depicted in FIG. 4) a flow path/conduit 50 for water into each depression 16 wherein the flow path/conduit 50 for water into each depression 16 wherein the flow path conduit 50 extends from port 20 at the bottom of each depression 16 to the top of underdrain 11 and (3) mounting a water distribution nozzle 70 on the flow path/conduit.

One embodiment of the invention provides a method for retrofitting a water filtration system underdrain 11, 111, the underdrain having a top surface 12, 112, a bottom surface 14, 114 that forms a ceiling portion of a plenum 30, 130, and a depression 16, 116 in the top surface terminating in a port 20, 120 allowing fluid communication between the plenum 30, 130 and the top surface 12, 112, the method comprising the steps of 1) positioning an insert 44 (e.g., the insert of FIG. 12) into the depression 16, the insert 44 having an insert top surface 46 substantially coplanar with the top surface of the underdrain 12, and a conduit 150 configured to provide fluid communication between the top surface of the insert 46 and the port 20; and 2) attaching a water distribution nozzle 70 to the conduit at the top surface of the insert 46 such that the nozzle 70 is in fluid communication with the conduit 150. The present method does not require any prearranged order of steps, but typically the nozzle is attached before the insert is positioned into the depression.

The insert of the present method can be numerous shapes, but typically the insert is pyramidally-shaped to fit the general inverted pyramidal configuration of most underdrains. Furthermore, a variety of methods and materials can be used to make the inserts, but typically the insert is a molded plastic insert. In certain embodiments of the present invention, the insert includes a plate portion 51 defining the insert top surface 46. Further, the insert optionally includes a support portion 53 extending between the plate portion 51 and the conduit 150 and/or a support portion 54 extending between the plate portion 51 and the side plate 56 of the insert 44 and/or a support portion 55 extending between the conduit 150 and the side plate 56 of the insert 44 to provide structural support to the plate portion 51.

In other embodiments of the present method, the conduit 50 is configured to provide fluid communication with the port 20, then filler substance 90 is placed into the depression 16 to form a top filler surface 310. Further, a plug 60 can be placed in the upper end of the conduit 50 before the filler substance 90 is placed into the depression 16 and can be removed from the upper end of the conduit after the filler substance is placed into the depression.

In another such embodiment of the method for retrofitting a water filtration system underdrain, also depicted in FIG. 4, a conduit 50 is again configured so that the conduit 50 provides fluid communication with the port 20, a filler substance 90 is placed into the depression 16 around the conduit 50 until the filler substance is level with the top surface of the underdrain 12, and a water distribution nozzle 70 is mounted onto the conduit so that a bottom surface of the nozzle 72 is substantially coplanar with the top surface 12 of the underdrain.

In another embodiment, a method is provided for retrofitting a water filtration system underdrain. This embodiment of the invention comprises the steps of positioning a conduit in fluid communication with the port whereby the conduit forms a flow path from the plenum through the port, and attaching a nozzle to the conduit. In this embodiment, a filler substance can be poured into the depression around the conduit to fill the depression, in an amount sufficient to substantially fill the depression.

Figure 9:
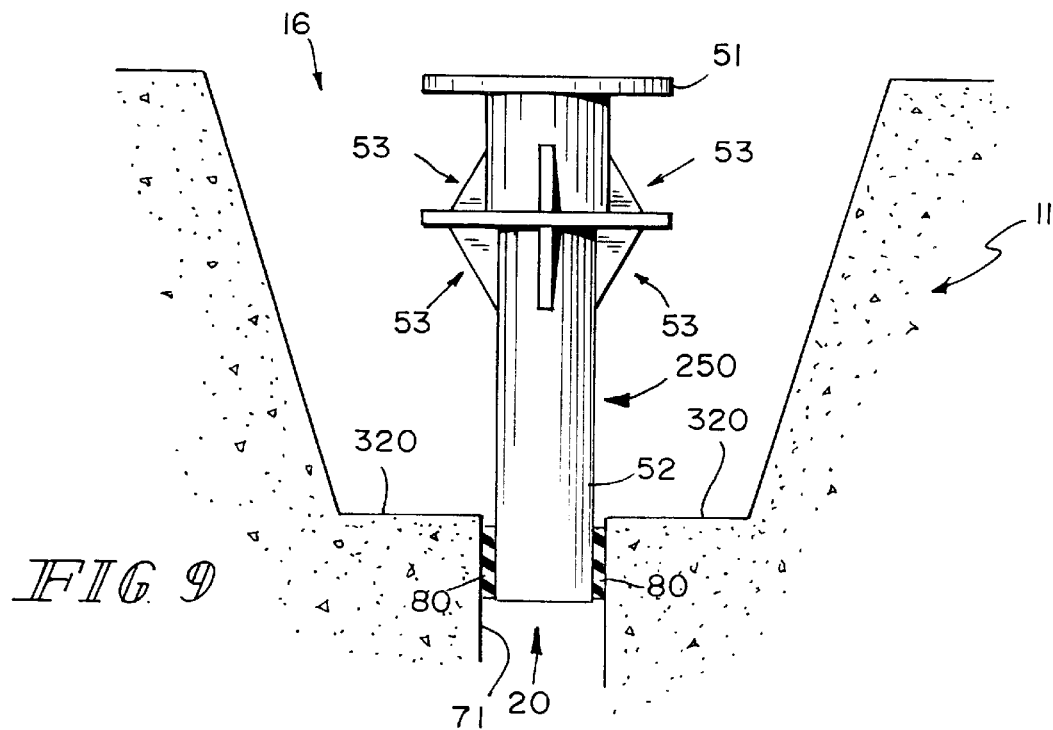
FIG. 9 is a side view of an underdrain, such as a Wheeler underdrain or Bell bottom underdrain, showing a depression and a conduit having an end positioned inside of a port in the underdrain wherein the conduit is coupled to the solid boundary of the port.
Figure 10:
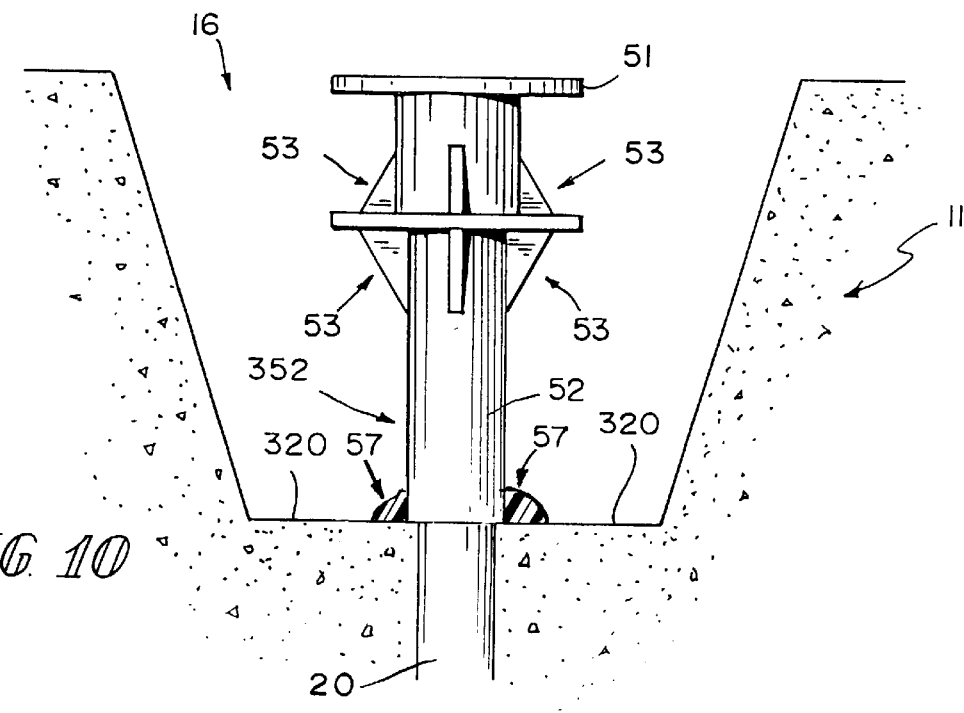
FIG. 10 is a side view of an underdrain, such as a Wheeler underdrain or a Bell bottom underdrain, showing a depression and a conduit having an end positioned on the bottom surface of the a depression over a port in the underdrain wherein the conduit is coupled to the bottom surface of the depression by a sealing substance.
Figure 11:
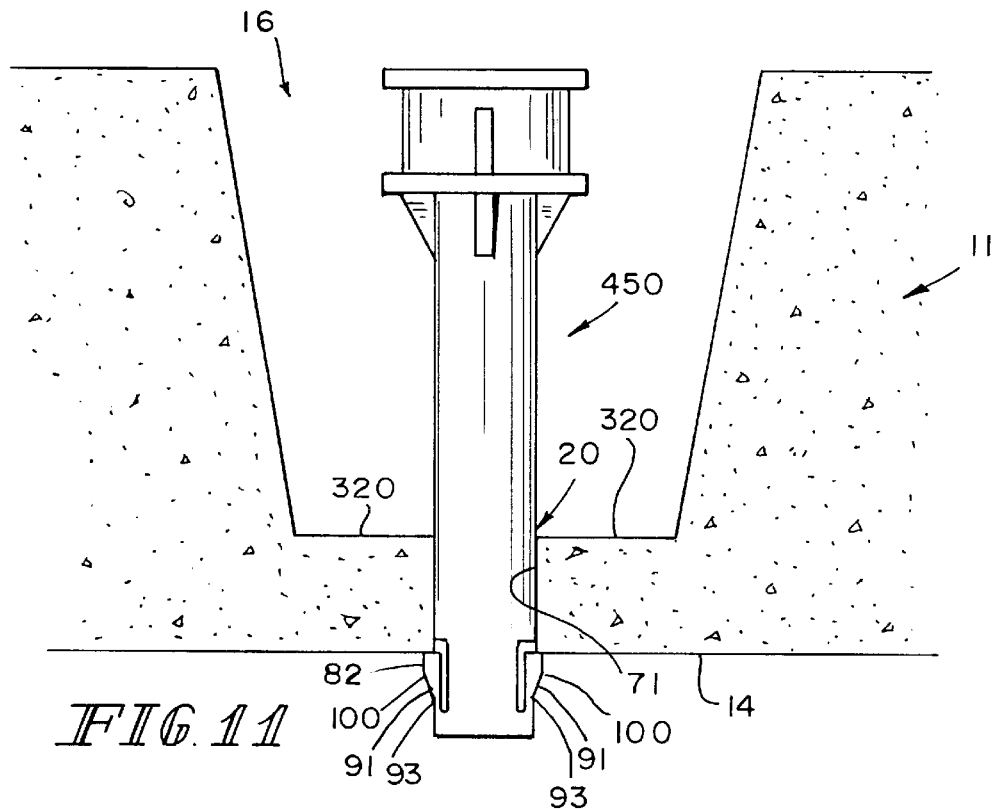
FIG. 11 is a side view of a Wheeler underdrain or a Bell bottom underdrain showing a depression and a conduit wherein an end of the conduit is positioned in a port in the underdrain and wherein two tabs, each integral with a finger of the conduit, are contacting the bottom surface of the underdrain, thereby preventing the conduit from backing out of the port in the underdrain.

Preferably, the conduit used in the present method includes attachment means to secure the conduit to the underdrain and lessen the chances of inadvertent removal of the conduit from contact with the underdrain. In all embodiments of the method described herein, attachment can be accomplished, for example, by direct coupling of a conduit to a solid boundary 71 of a port as shown in FIG. 9 and/or by using a sealing substance 57 as depicted in FIG. 10, and/or by using a conduit comprising fingers 91 and tabs 100 as shown in FIG. 11 configured to contact the undersurface of the underdrain.

The present invention also comprises a retrofit apparatus for a filtration system underdrain, the underdrain having a top surface, a bottom surface, a depression surface extending from the top surface toward the bottom surface and defining a depression, and an opening surface extending between the depression surface and the bottom surface and defining an opening through the underdrain, the apparatus comprising a nozzle, a conduit coupled to and in fluid flow communication with the nozzle and the opening surface, the conduit comprising inner and outer surfaces, and a filler substance contacting the outer surface of the conduit and configured to substantially fill the depression. The present invention encompasses embodiments of the apparatus wherein the nozzle has a truncated conical shape and has a plurality of openings in fluid flow communication with the conduit, and wherein the conduit is cylindrically shaped.

In another embodiment of the present invention a retrofit apparatus for the underdrain describe in the preceding paragraph is provided. The apparatus comprises a nozzle, and a pre-molded insert for installing in the depression and coupled to the nozzle. The pre-molded insert is formed to mate with the depression surface and bottom surface of the depression and comprises a top surface and a channel defining a flow path, the channel in fluid flow communication with the nozzle and the opening surface. Further embodiments of the apparatus comprise a nozzle that has a truncated conical shape and a plurality of openings in fluid flow communication with the channel.

Figure 5:
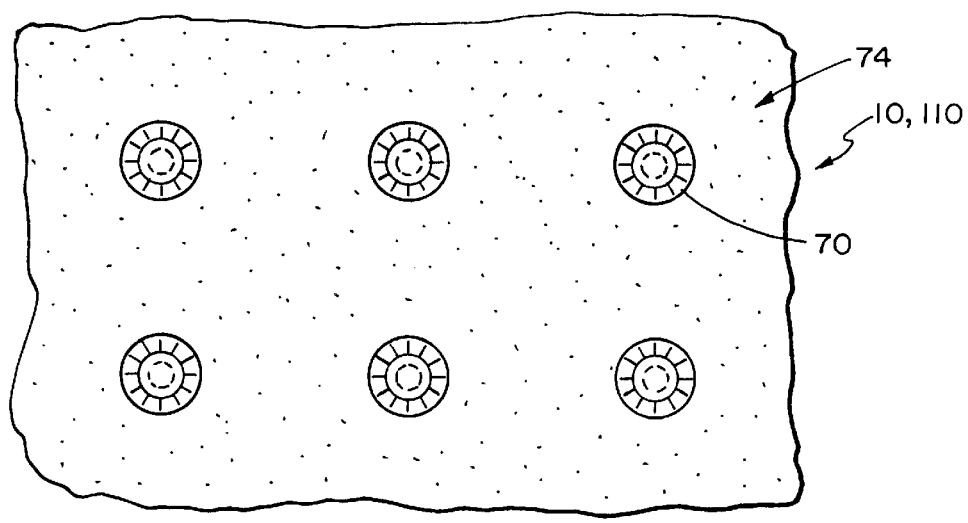
FIG. 5 shows a top plan view of a Bell bottom underdrain or Wheeler underdrain after a plurality of inverted pyramidal depressions have been filled with grout and water distribution nozzles have been screwed into conduits extending through the grout.

As shown in FIG. 4, in a preferred embodiment of the present invention, glass caps 40 or ceramic balls 42 are removed conduit 50 is positioned in each depression 16 in fluid flow communication with port 20 or pipe 22 for Bell bottom underdrain system 10 or Wheeler underdrain system 110. In Bell bottom underdrain system 10, conduit 50 is coupled to pipe 22. In Wheeler underdrain system 110, conduit 50 is coupled to port 20. Depressions 16 are then each filled with filler substance 90. Conduit 50 coupled to pipe 22 or port 20 maintains a fluid flow path through depressions 16 during the filling step. In this embodiment, filler substance 90 entirely fills the depressions 16 so that top filler surface 310 is substantially coplanar with underdrain top surface 12 of underdrain 11 to form a substantially flat top surface 74. A nozzle 70 is coupled to conduit 50 so that the bottom surface 72 of nozzle 70 is substantially flush with the top filler surface 310 of the filler substance 90. FIG. 5 shows a plan view of underdrain 11 after depressions 16 have been filled with filler substance 90 and nozzles 70 have been screwed into conduit 50 extending through filler substance 90.

In all embodiments of the current invention, nozzle 70 can be mold-formed from a plastic material or the like, or any of a number of commercially available nozzles can be used. Typically, a fastener 76 is provided allowing the nozzle 70 to be attached to the conduit 50. In one embodiment, the fastener 76 contains a nozzle thread 78 removably interconnected with a conduit thread 80 located on the upper end of conduit 50.

The nozzle 70 allows water to pass through the filtration media and into the conduit 50 while restraining the filtering media, thereby preventing the filtration media from passing into conduit 50 and, from there, into plenum 30. Typically, the nozzle 70 will have slit apertures 350 (see FIG. 12) configured to allow water to pass from the filtration media and into the flow path of the conduit. Additionally, the slit apertures 350 of the nozzle 70 disperse water evenly during reverse-feeding of water to cleanse the filtration media.

In one embodiment of the invention depicted in FIG. 4, when filler substance 90 is used to fill depression 16, a flow path for the water is thereby maintained by conduit 50. After conduit 50 is coupled to pipe 22 or port 20 in each depression 16, a plug 60 is inserted into conduit 50 to prevent filler substance 90 from entering conduit 50 when filler substance 90 is poured into depression 16. Filler substance 90 can then be poured into depressions 16 of underdrain 11 to create a flat top filler surface 310 coplanar with top surface 12 of underdrain 11 and the top surface of plug 60. Plug 60 can be, for example, mold-formed from a plastic material.

Figure 8:
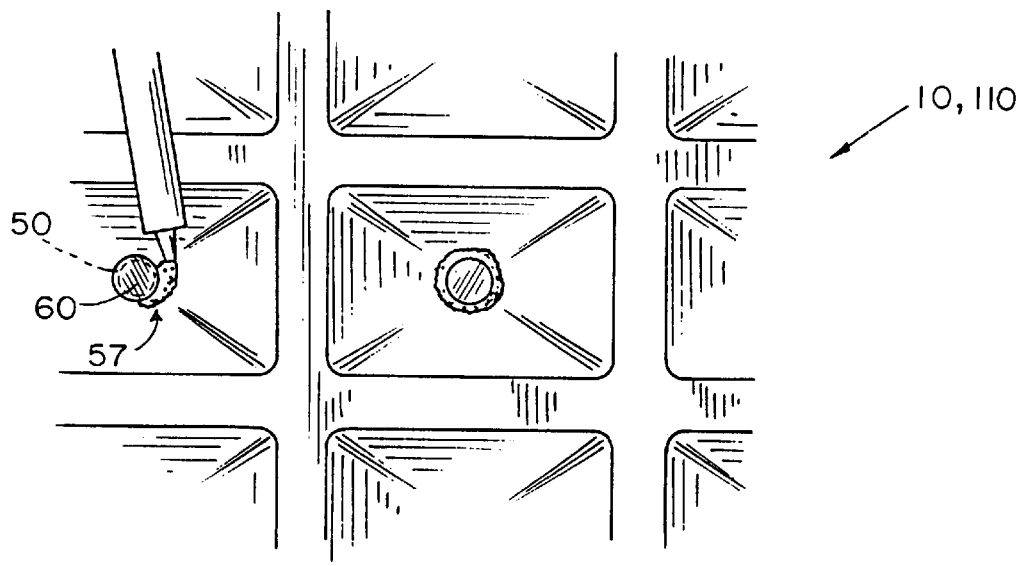
FIG. 8 shows a plurality of depressions in the Bell Bottom underdrain or Wheeler underdrain, wherein the depressions each include a conduit having a cap on the top surface of the conduit to prevent grout from entering the conduit.

At this point, as shown in FIGS. 4 and 5, underdrain 11 no longer has depressions, but is a block-shaped member with a flat top surface 74 formed by the top filler surface 310 of filler substance 90 and the top surface 12 of underdrain 11, having a plurality of flow paths extending therethrough as defined by conduits 50 and pipes 22 or ports 20. Plugs 60 can then be removed and nozzles 70 can be screwed into conduit 50 as shown in FIGS. 4 and 8. Each nozzle 70 duplicates the function of glass cap 40 in the Bell bottom underdrain system 10 and the ceramic balls 42 in the Wheeler underdrain system 110 by uniformly distributing the cleansing water upwardly through the gravel 13, sand 19, and anthracite coal 21.

Filler substance 90 can be any substance capable of filling depression 16. Preferably, filler substance 90 is placed into depression 16 in an amount sufficient to fill depression 16 such that top filler surface 310 of filler substance 90 forms a substantially flat top surface 74 with the top surface 12 of underdrain 11. Alternatively, top filler surface 310 of filler substance 90 is below top surface 12 of underdrain 11. A preferred filler substance 90 is cement grout which is allowed to cure or harden after it is placed in depression 16. However, other curable or setting substances are also useful as filler substance 90.

Figure 6:
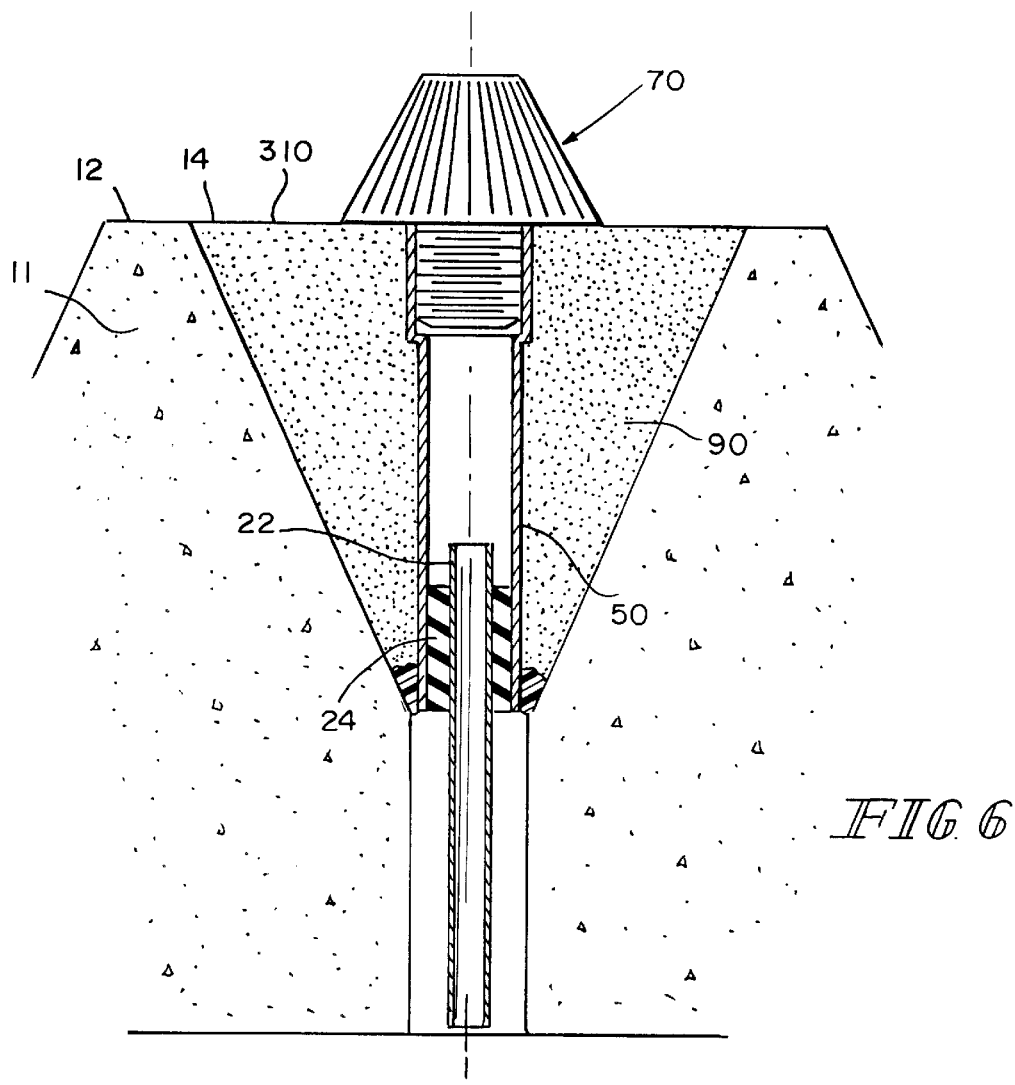
FIG. 6 shows a cross-sectional view of a depression including a water distribution nozzle and a conduit coupled to a pipe near the bottom of the depression.
Figure 7:
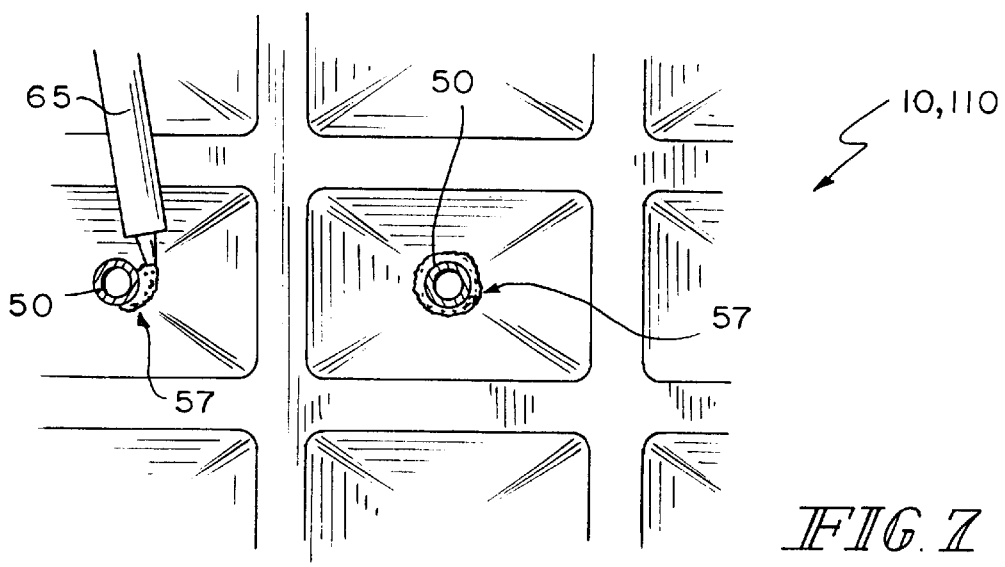
FIG. 7 shows a plurality of depressions in a Bell bottom underdrain or Wheeler underdrain including a center depression wherein a conduit has been coupled to a pipe and wherein the point of coupling has been adequately sealed to prevent leaking, and a left depression wherein a conduit has been coupled to a pipe and wherein a sealing substance apparatus is being used to adequately seal the coupling.

FIG. 6 illustrates an embodiment preferred for use in retrofitting Bell bottom underdrain system 10, but also useful for retrofitting Wheeler underdrain system 110. In FIG. 6, conduit 50 is coupled to pipe 22 using a spacer 24. Spacer 24 is positioned around a portion of pipe 22. Conduit 50 is then positioned over spacer 24. The coupling is sealed with a sealing substance 57 as shown in FIG. 10, such as seka flex or epoxy, to prevent leaking generally by using a sealing substance apparatus 65 as in FIGS. 7 and 8.

FIGS. 9, 10, and 11 illustrate alternate embodiments for coupling conduit 50 to underdrain 11 for use in retrofitting Wheeler underdrain system 110, but these embodiments are also useful for retrofitting Bell bottom underdrain system 10. One of ordinary skill in the art would understand that various mechanisms exist for coupling conduit 50 to underdrain 11. In one embodiment shown in FIG. 9, conduit 250 is coupled directly to a solid boundary 71 of port 20. In accordance with another embodiment of the invention shown in FIG. 10, the lower end of conduit 352 has an outer diameter that is greater than the diameter of port 20 so that the lower end of conduit 352 is positioned on the bottom surface 320 of depression 16 over port 20. Sealing substance 57, such as seka flex or epoxy, is deposited between conduit 352 and bottom surface 320 of depression 16 to couple conduit 352 to bottom surface 320 of depression 16. In another embodiment of the invention depicted in FIG. 11, a conduit 450 is coupled to solid boundary 71 by one or more fingers 91 each including a tab 100 positioned on opposing sides of the lower end of conduit 450. Fingers 91 and tabs 100 are integral with conduit 450, each finger 91 comprising a hinge 93 integrally coupling finger 91 to conduit 450 and three sides 82 spaced apart from conduit 450. The hinge and three sides cooperate to define finger 91 as, for example, rectangular in shape. The conduit 450 is lowered into depression 16 and into port 20. As conduit 450 is lowered into port 20, solid boundary 71 pushes axially inward on tabs 100 to flex fingers 91 inwardly. When tabs 100 exit port 20 near bottom surface 14 of underdrain 11, fingers 91 snap outwardly returning to an unflexed position causing tabs 100 to contact bottom surface 14. Tabs 100 lock conduit 450 in port 20.

In further describing conduit 50, 150, 250, 352, or 450, the conduit can be, for example, a mold-formed plastic, cylindrically shaped tube as shown in FIGS. 4, 9, 10, 11 and 12. As shown in FIGS. 9–11, the conduit can also include a plate portion defining the top surface of conduit 50, a tube portion 52 extending from plate portion 51 to the other end of conduit 50, and a support portion 53 extending between plate portion 51 and tube portion 52 to provide structural support to plate portion 51.

Certain other embodiments of the present invention involve the use of inserts 44 formed to fit within depressions 16. As shown in FIGS. 12–15, various embodiments of insert 44 can be used identified as inserts 44, 144, and 244.

Figure 12:
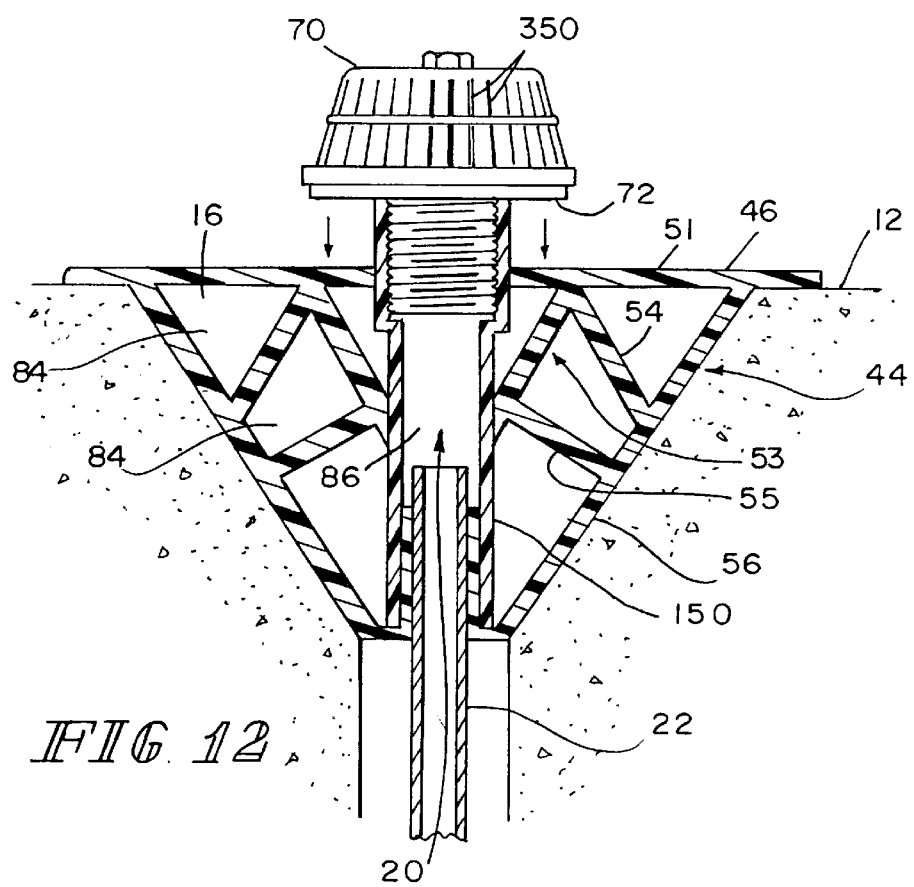
FIG. 12 is a cross-sectional view of an insert that is placed in a depression.

As shown in FIG. 12, certain embodiments of the present invention involve a method of retrofitting an underdrain 11 using an insert 44 wherein plate 51 extends to cover the depression 16 except for the opening to conduit 150. Such inserts can optionally contain support portions 53 and/or 54 and/or 55 to give added support to plate 51 to withstand the weight of the filtration media when that media is added back after completion of the retrofit. Filler substance 90 can optionally be used to fill in the depression spaces 84 found underneath plate 51. Insert 44 is shaped to fit within depression 16 and can be affixed in depression 16 using a sealant or adhesive. Insert 44 provides a channel 86 in fluid flow communication with port 20 or pipe 22 and allows fluid flow communication between port 20 or pipe 22 and nozzle 70.

FIG. 12 shows an optional embodiment wherein the nozzle 70 is not situated with its bottom surface 72 flush with insert top surface 46, but rather a small space is left between insert top surface 46 and nozzle bottom surface 72

Figure 13:
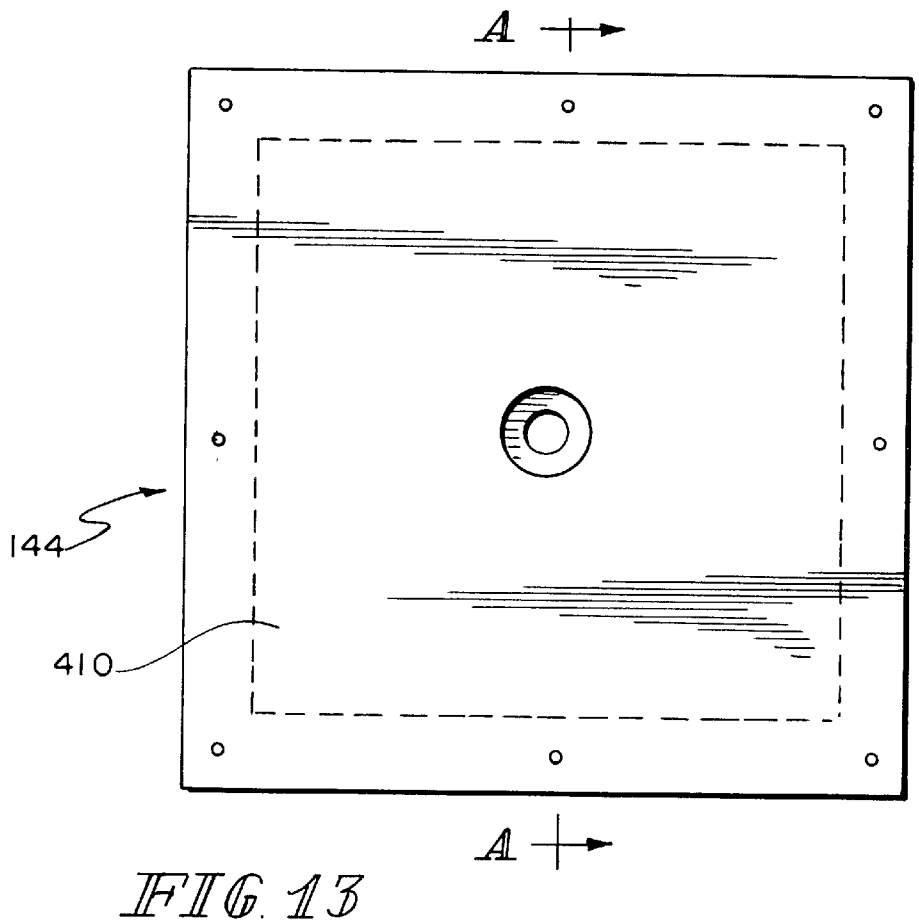
FIG. 13 shows a top plan view of an insert that is placed in a depression.
Figure 14:
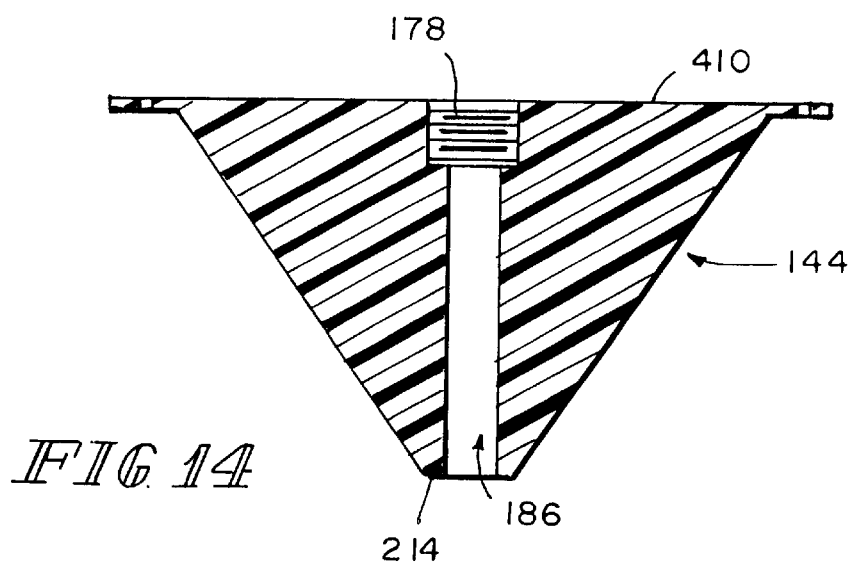
FIG. 14 is a sectional view along line A—A of FIG. 13 showing a pyramidally-shaped insert including a channel that extends between the top and bottom of the insert.

Alternate embodiments of the invention are shown in FIGS. 13 and 14. Instead of filling depressions 16 with filler substance 90, an insert 144 is cemented into each depression 16 to provide the top surface 410 for mounting nozzle 70. Insert 144 can be made of plastic or concrete, for example, and has a solid structure (typically pyramidal) sized and shaped to mate exactly with depressions 16 formed in underdrain 11. Insert 144 is formed to include a channel 186 that extends between the top surface 410 and bottom surface 214 of insert 144 as shown in FIG. 14. Channel 186 performs the same function as the conduits discussed above for other embodiments of the invention and is formed to include conduit threads 178 for mounting nozzle 70 to insert 144. Nozzle 70 is then coupled to insert 144 through conduit threads 178 so that the bottom surface of nozzle 70 is substantially flush with the flat surface of insert 144.

Figure 15:
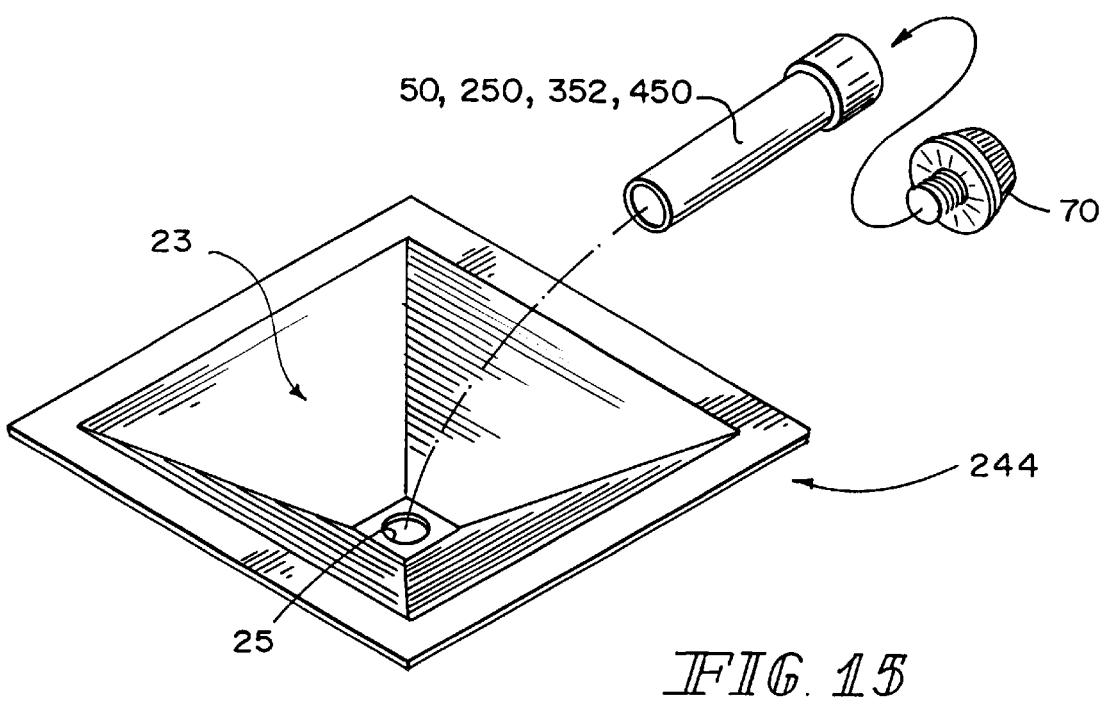
FIG. 15 shows an insert to be placed in a pyramidally-shaped depression wherein the insert includes an insert space, a conduit, and a water distribution nozzle.

Another embodiment of the insert for use in the present invention is shown in FIG. 15. An insert 244 is positioned into depression 16. Insert 244 is preferably constructed of mold-formed plastic and configured to contact and mate with depression surface 18. As such, insert 244 is typically pyramidally-shaped and defines a pyramidally-shaped space 23. As shown in FIG. 15, insert 244 is preferentially formed to include an aperture 25 that allows fluid flow communication with port 20 or pipe 22. In this embodiment, conduit 50, 250, 352, or 450 is attached to insert 244 to form fluid flow communication between the conduit and port 20 or pipe 22. Nozzle 70 is coupled to the conduit to allow fluid flow communication between nozzle 70 and port 20 or pipe 22. In this embodiment, space 23 can optionally be filled with filler substance 90 or with filtration media. In another embodiment of the invention, nozzle 70 is placed directly in fluid flow communication with port 20 or pipe 22, thus eliminating the conduit.

Figure 16:
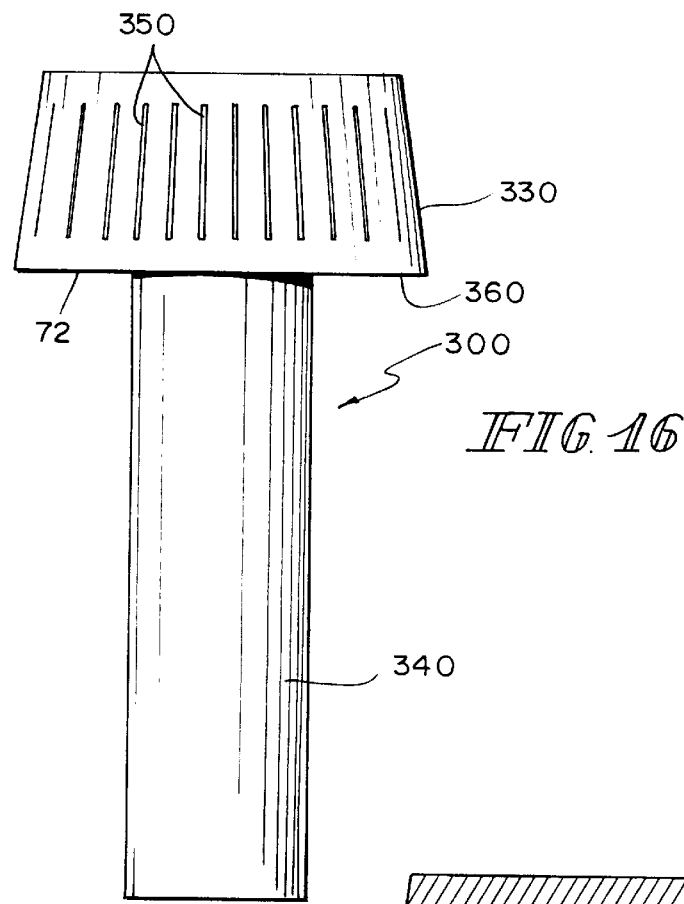
FIG. 16 is a side view of an integral flow path member.
Figure 17:
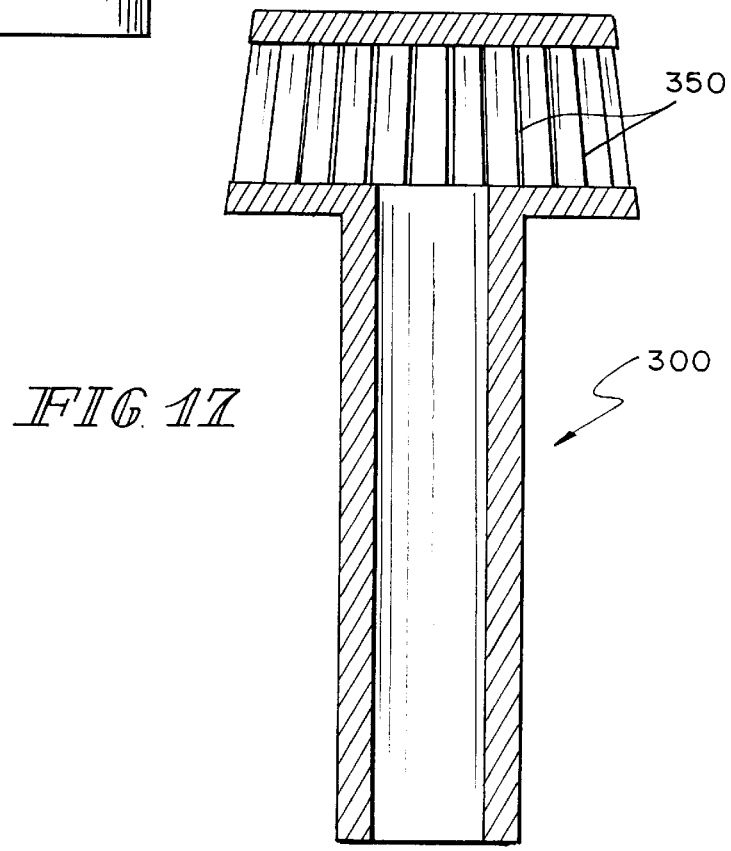
FIG. 17 is a cross-sectional view of the integral flow path member of FIG. 16.
Figure 18:
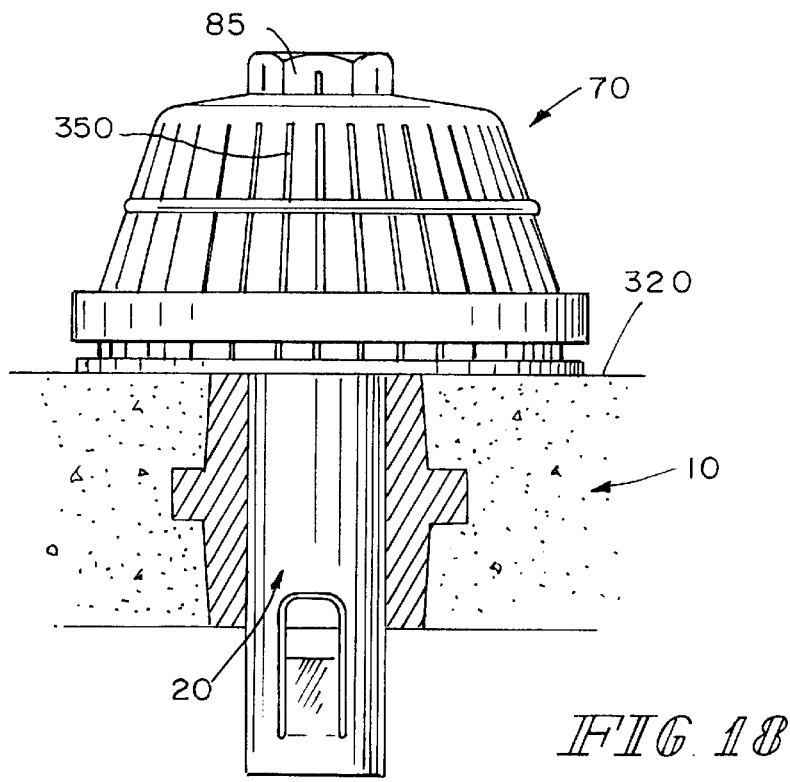
FIG. 18 is a side view of a water-distribution nozzle coupled to a conduit positioned in a port of an underdrain.
Figure 19:
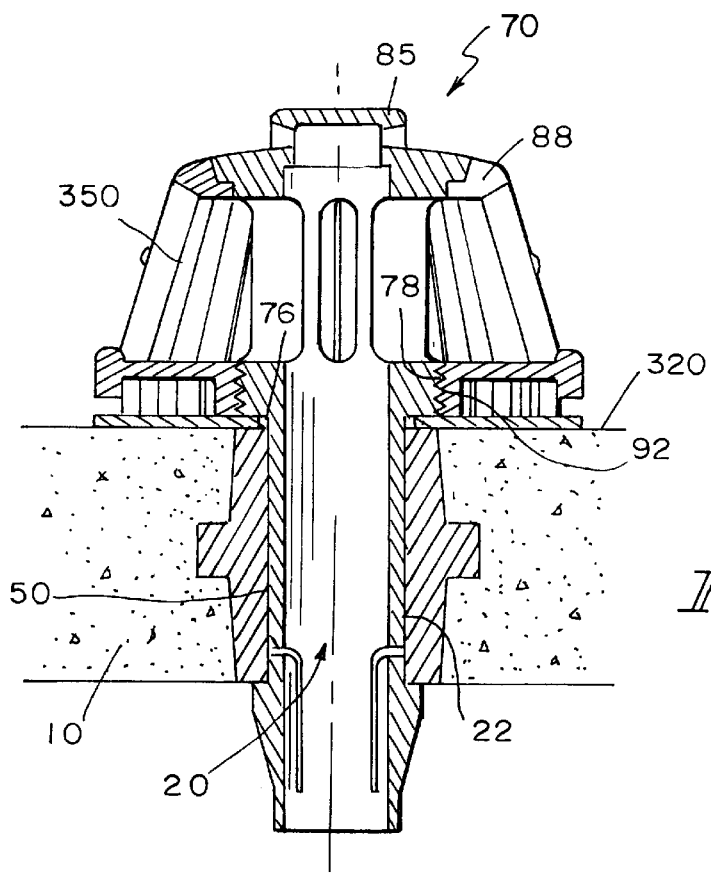
FIG. 19 is a cross-sectional view of a water-distribution nozzle coupled to a conduit positioned in a port of an underdrain.
Figure 20:
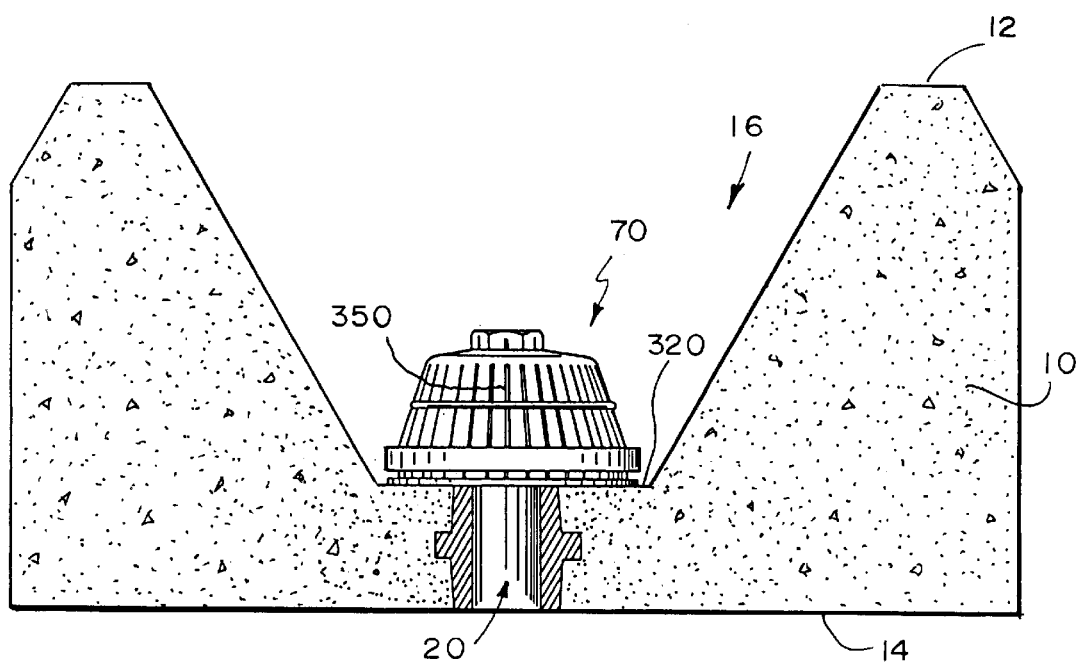
FIG. 20 is a sectional view of a water-distribution nozzle coupled to a conduit positioned in a port of an underdrain.

As shown in FIGS. 16 and 17, an integral flow path member 300 performs the same function as conduit 50 and nozzle 70 of the previously described embodiments of the invention. Integral flow path member 300 includes a nozzle portion 330 and a conduit portion 340 such that it is configured substantially as one unit and serves the same function as the conduit and nozzle configurations described in previous embodiments of the invention. Integral flow path member 300 can be coupled to underdrain 11 or 111 of Bell bottom underdrain system 10 or Wheeler underdrain system 110, respectively, according to the coupling mechanisms discussed in the previously described embodiments of the invention. When so coupled, the bottom surface 360 of the nozzle portion of integral flow path member 300 is positioned at a point located above the bottom surface 320 of depression 16. In another embodiment, the bottom surface 72 of the nozzle portion of integral flow path member 300 is flush with the bottom surface 320 of depression 16 as shown in FIGS. 18–20. (FIGS. 18 and 19 show use of the finger 91 coupling mechanism.).

As shown in FIG. 19, nozzle 70 can optionally have a nozzle cap 85 that is attached to the main nozzle body 88. This nozzle cap 85 can be configured to contain nozzle threads 78 that engage screw threads 92 located on the upper end of conduit 50 and thereby hold the nozzle body 88 in contact with conduit 50. Alternatively, nozzle 70 can be formed as an integral member without the optional nozzle cap 85, as shown in FIG. 20.

Although the invention has been described in detail with reference to certain illustrated embodiments, variations and modifications exist within the scope and spirit of the invention as described and as defined in the following claims.

What is claimed is:

1. A method for retrofitting a water filtration system underdrain having a top surface, a bottom surface, a depression surface extending from the top surface toward the bottom surface and defining a depression, and an opening surface extending between the depression surface and the bottom surface and defining an opening providing fluid communication between the depression surface and the bottom surface, the method comprising the steps of configuring a conduit so that the conduit communicates with the opening to define a flow path extending from the opening upwardly through the depression, placing filler substance into the depression around the conduit until the filler substance is level with the top surface of the underdrain, and mounting a nozzle to the conduit so that a bottom surface of the nozzle is substantially coplanar with the top surface of the underdrain.

2. The method of claim 1, wherein the conduit is a mold-formed plastic tube.

3. The method of claim 1, wherein the conduit is cylindrically shaped.

4. The method of claim 1, wherein the nozzle is formed from a plastic material.

5. The method of claim 1, further comprising the step of installing a cap into an upper portion of the conduit to prevent filler substance from entering the flow path while the filler substance is poured into the depression.

6. The method of claim 5 wherein the cap is formed from a plastic material.

7. The method of claim 5, wherein a top surface of the cap is substantially coplanar with the top surface of the underdrain.

8. A method for retrofitting a water filtration system underdrain having a top surface, an undersurface that forms a ceiling portion of a plenum, and a depression in the top surface terminating in a port allowing fluid communication between the plenum and the top surface of the underdrain, the method comprising the steps of positioning a conduit to contact the port whereby the conduit forms a flow path from the plenum upwardly through the port; and attaching a nozzle to the conduit.

9. The method of claim 8 further comprising pouring filler substance into the depression around the conduit to fill the depression.

10. The method of claim 9 wherein the filler substance is poured into the depression in an amount sufficient to substantially fill the depression such that a top surface of the filler substance is substantially coplanar with the top surface of the underdrain.

11. The method of claim 8 wherein the conduit contains fingers configured to contact the undersurface of the underdrain.

12. The method of claim 9 wherein the conduit contains fingers configured to contact the undersurface of the underdrain.

* * * * *